United States Patent [19]

Wang

[11] Patent Number: 5,292,863
[45] Date of Patent: Mar. 8, 1994

[54] PROCESS FOR REMOVING UNPOLYMERIZED GASEOUS MONOMERS FROM OLEFIN POLYMERS

[75] Inventor: Duan-Fan Wang, Somerville, N.J.

[73] Assignees: Union Carbide Chemicals; Plastics Technology Corporation, Danbury, Conn.

[21] Appl. No.: 970,190

[22] Filed: Nov. 2, 1992

[51] Int. Cl.⁵ ............................................. C08F 6/28
[52] U.S. Cl. .................................................. 528/483
[58] Field of Search ................................... 528/483

[56] References Cited

U.S. PATENT DOCUMENTS

| | | | |
|---|---|---|---|
| 3,866,332 | 2/1975 | Hertz | 34/57 |
| 4,372,758 | 2/1983 | Bobst et al. | 528/483 |
| 4,596,079 | 6/1986 | Brod | 34/171 |
| 4,758,654 | 7/1988 | Brod | 528/482 |

FOREIGN PATENT DOCUMENTS 2084044  4/1982  United Kingdom .

*Primary Examiner*—Joseph L. Schofer
*Assistant Examiner*—Tom Weber
*Attorney, Agent, or Firm*—B. L. Deppenbrock

[57] ABSTRACT

A process for removing unpolymerized gaseous monomers from a solid olefin polymer containing said gaseous monomers by feeding an inert purge gas through a vessel containing constraint means which defines the upper limit of an expandable bed in the vessel and countercurrently contacting the solid polymer under expanded bed conditions.

14 Claims, 2 Drawing Sheets

PROCESS FOR REMOVING UNPOLYMERIZED GASEOUS MONOMERS FROM OLEFIN POLYMERS

BACKGROUND OF THE INVENTION

1. Field of the Invention

The present invention relates to a process and apparatus for removing unpolymerized gaseous monomers from solid olefin polymers, and more particularly and in a preferred embodiment, to a process for removing unpolymerized gaseous hydrocarbon monomers from granular, low pressure-polymerized, low density ethylene polymers, particularly "sticky polymers" such as ethylene, propylene, diene terpolymers.

2. Description of the Prior Art

It has long been known that olefins such as ethylene can be polymerized by contacting them under polymerization conditions with a catalyst comprising a transition metal compound, e.g., titanium tetrachloride and a cocatalyst or activator, e.g., an organometallic compound such a triethyl aluminum. Catalysts of this type are generally referred to as Ziegler catalysts.

Low density ethylene polymers (i.e., ethylene polymers having a density of about 0.94 g/cc and lower) have in the past been made commercially by a high pressure (i.e., at pressures of 15,000 psi and higher) homopolymerization of ethylene in stirred and elongated tubular reactors in the absence of solvents using free radical initiators. Recently, low pressure processes for preparing low density ethylene polymers have been developed which have significant advantages as compared to the conventional high pressure process. One such low pressure process is disclosed in commonly assigned, U.S. Pat. No. 4,302,565.

This patent discloses a low pressure, gas phase process for producing low density ethylene copolymers having a wide density range of about 0.91 to about 0.94 g/cc. More recently low density ethylene copolymers have been produced having densities of about 0.86 to about 0.96 g/cc.

The resulting granular polymers produced from conventional low pressure processes usually contain gaseous unpolymerized monomers including hydrocarbon monomers. These gaseous monomers should be removed from the granular resin for safety reasons, since there is a danger of explosion if the hydrocarbon monomer concentration becomes excessive in the presence of oxygen. In addition, proper disposal of the hydrocarbon is required in order to meet environmental standards concerning hydrocarbon emissions.

The prior art teaches techniques for removing volatile unpolymerized monomers from polymers of the corresponding monomers. See for example, U.S. Pat. Nos. 4,197,399, 3,594,356 and 3,450,183.

U.S. Pat. No. 4,372,758 issued Feb. 8, 1983 to R. W. Bobst et al and which is assigned to a common assignee discloses, a degassing or purging process for removing unpolymerized gaseous monomers from solid olefin polymers. The purging process generally comprises conveying the solid polymer (e.g., in granular form) to a purge vessel and contacting the polymer in the purge vessel with a countercurrent inert gas purge stream to strip away the monomer gases which are evolved from the polymer.

Unfortunately, however, when producing certain types of ethylene polymers, such as "sticky polymers" certain problems are encountered because of the type of monomers to be removed. Although these sticky polymers can be rendered non-sticky in the reactor, see for example U.S. Pat. No. 4,994,534 issued Feb. 19, 1991, there still remains the problem of effectively removing diene monomers, e.g., ENB from the polymers during the purging process. For example, in producing ethylene, propylene, diene terpolymers, monomers such as ethylidene norbornene (ENB) remaining in the product must be substantially purged from the product due to cost and environmental considerations. However ENB has a significantly low diffusivity. If the traditional packed bed process is used, it would require an impractically long residence time or an extra large amount of purge gas. It is clear that the conventional packed bed process is not entirely suitable for ENB purging.

Thus, the versatility of the resin post-reaction treatment processes have not evolved at the pace of the gas phase reactor technology which has been extended to the production of fluidizable but non-free flowing solid polymer as disclosed in U.S. Pat. No. 4,710,538 issued Dec. 1, 1987. These non-free flowing granular resins are referred to sometimes as "sticky polymers" because of their tendency to aggregate in larger particles and to eventually form large chunks of solid polymer.

The term "sticky polymer" is defined as a polymer, which although particulate at temperatures below the sticking temperature, agglomerates at temperatures above the sticking temperature. The term "sticking temperature", which, in the context of this specification, concerns the sticking temperature of particles of polymer in a fluidized bed, is defined as the temperature at which fluidization ceases due to the agglomeration of particles in the bed. The agglomeration may be spontaneous or occur on short periods of settling.

A polymer may be inherently sticky due to its chemical or mechanical properties or pass through a sticky phase during the production cycle. Sticky polymers are also referred to as non-free flowing polymers because of their tendency to compact into aggregates of much larger size than the original particles and not flow out of the relatively small openings in the bottom of product discharge tanks or purge bins. Polymers of this type show acceptable fluidity in a gas phase fluidized bed reactor; however, once motion ceases, the additional mechanical force provided by the fluidizing gas passing through the distributor plate is insufficient to break up the aggregates which form and the bed will not refluidize. These polymers are classified as those, which have a minimum bin opening for free flow at zero storage time of two feet and a minimum bin opening for free flow at storage times of greater than five minutes of 4 to 8 feet or more.

Sticky polymers can also be defined by their bulk flow properties. This is called the Flow Function. On a scale of zero to infinity, the Flow Function of free flowing materials such as dry sand is infinite. The Flow Function of free flowing polymers is about 4 to 10, while the Flow Function of non-free flowing or sticky polymers is about 1 to 3.

Although many variables influence the degree of stickiness of the resin, it is predominantly governed by the temperature and the crystalinity of the resin. Higher temperatures of the resin increase its stickiness while less crystalline product such as very low density polyethylene (VLDPE), ethylene/propylene monomer (EPM), ethylene/propylene diene monomer (EPDM)

and polypropylene (PP) copolymers usually display a larger tendency to agglomerate in larger particles.

The mechanical agitation of a fluid bed or stirred gas phase reactor is somewhat sufficient to prevent the agglomeration of sticky polymers in the vessel. However current post reactor processing and handling equipment utilized with gas phase reactors are not specifically designed to process sticky polymers. For example the conventional packed bed purging processes tend to have uneven gas distribution in the purge vessel. Purge gas seems to bypass through certain channels without contact with the majority of solids. It is submitted that this poor solid-gas contact condition in the conventional packed bed process is the primary reason that purging is at least one order of magnitude worse than theoretical prediction.

More recently, copending application Ser. No. 07/701,999 filed May 17, 1991, now abandoned and assigned to a common assignee attempts to ameliorate the prior art problems by providing a process for removing unpolymerized gaseous monomers from a solid olefin polymer by utilizing a purge vessel provided with at least one substantially vertically disposed grid plate positioned substantially transversely across said vessel. The grid plate defines openings in an amount and size sufficient to permit passage of solid olefin polymer and an inert gas through said at least one grid plate. An inert feed gas is fed to the purge vessel and through the openings in the grid plate in countercurrent contact with the polymer, the inert purge gas being utilized in an amount and at a velocity sufficient to form a fully expanded bed in the purge vessel.

Although this process overcomes many disadvantages incident to prior art techniques, it is still not the panacea since the process requires strict control of the superficial gas velocity in order to obtain expanded bed operation.

The present invention provides an improvement over the process disclosed in application Ser. No. 07/701,999, now abandoned in that the superficial gas velocity need not be precisely controlled in order to obtain expanded bed operation. The terms "expanded bed" or expanded fluidized bed as used herein means that substantially every single solid in the bed is lifted and supported by the drag force of the purge gas.

The term "packed bed" as used herein means that when the gas superficial velocity increases, the height of the resin bed increases slightly and the pressure drop of the resins increases proportionally to the gas superficial velocity. There is no sign of substantial formation of bubbles in the resin bed.

The term fluidized bed as used herein means that when the gas superficial velocity increases, the height of the resin bed and the pressure drop across the bed do not change. Bubbles travel through the whole bed and large scale bed circulation is observed.

The term expanded bed operation as used herein means that when the gas superficial velocity increases, the height of the resin bed increases significantly and the pressure drop across the resin bed increases proportionally to the gas superficial velocity. There is no sign of bubbles in the resin bed. Slight resin motion can be observed locally, but there is no large scale bed circulation.

Thus a solid bed is in a fully expanded mode when substantially every single solid in the bed is lifted and supported by the drag force of the purge gas. Therefore, a process operated in the expanded bed mode can insure that each solid in the expanded bed will be swept by the purge gas and thus offer an excellent solid-gas contact situation.

SUMMARY OF THE INVENTION

Broadly contemplated the present invention provides a process for removing gaseous monomers from a solid olefin polymer which comprises:
 (a) counter-currently passing a purge gas through said polymer in a purge vessel in an amount and at a velocity sufficient to remove substantially all of said gaseous monomers from said polymer and to form and maintain a fully expanded bed within said vessel having an upper limit defined by gas permeable, solids impermeable constraint means positioned within said vessel;
 (b) passing said gaseous stream containing said gaseous monomer through said constraint means and thence out of said vessel; and
 (c) discharging polymer solids from said vessel.

The present invention also provides an apparatus for removing gaseous monomers from a solid olefin polymer containing said gaseous monomers which comprises, a purge vessel having an upper portion; a lower portion adapted to accommodate an expanded bed of solids; a solids inlet disposed in said upper portion; a solids discharge disposed in said lower portion; feeding means disposed in said upper portion in communication with said inlet for feeding solids to said lower portion; gas permeable solids impermeable constraint means disposed below said feeding means defining the upper limit of said expanded bed of solids and defining a gas collection chamber between said feeding means and said constraint means; gas entry means disposed in said lower portion below said expanded bed of solids, and gas discharge means disposed in communication with said gas collection chamber for discharging gas from said chamber.

In a preferred aspect, the present apparatus invention is directed to the purging of ethylene, propylene diene monomer (EPDM) resin to reduce the amount of diene monomer such as ethylidenenorbornene (ENB) present in said resin.

DETAILED DESCRIPTION OF THE INVENTION

Figure 1:
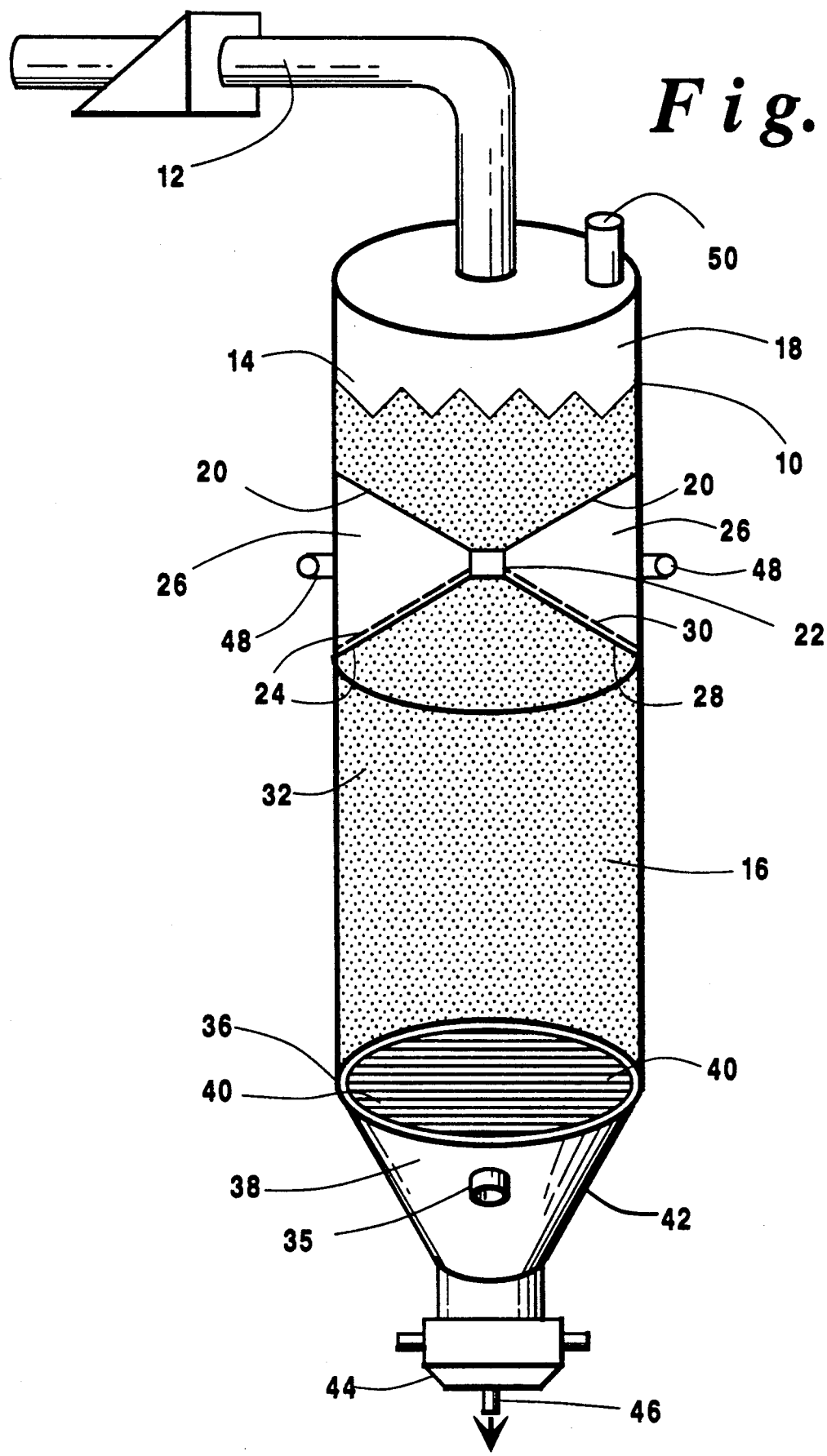
FIG. 1 is a representation of a purge vessel system which can be employed in the present invention with certain parts broken away to reveal interior details.

The solid olefin polymers to be purged can be produced by a variety of well known techniques. A particularly preferred technique is to produce the solid olefin polymers by a gas phase fluidized bed process which utilizes a fluid bed reactor such as described in U.S. Pat. No. 4,482,687.

For purposes of ease of description only, the present invention will be described herein with particular reference to EPDM terpolymers where applicable, although it is to be expressly understood that the invention is not to be limited thereby. Rather, it is the intention to be limited only by the scope of the claims appended hereto.

For example, the gas purging process of the present invention may be employed to purge solid olefin polymers other than EPDM terpolymers such as low pressure low density ethylene copolymers. The invention is preferably practiced with sticky polymers which have been rendered "non-sticky" such as by the process disclosed in U.S. Pat. No. 4,994,534 issued Feb. 19, 1991.

Examples of sticky polymers, which can be purged by the process of the present invention include ethylene/propylene rubbers and ethylene/propylene/-diene termonomer rubbers, polybutadiene rubbers, high ethylene content propylene/ethylene block copolymers, poly (1-butene) (when produced under certain reaction conditions), very low density (low modulus) polyethylenes i.e., ethylene butene rubbers or hexene containing terpolymers, and ethylene/propylene/ethylidenenorbornene terpolymers of low density.

Depending upon the conditions of reaction and the particular diene monomer, the resulting EPDM terpolymer can contain an amount of gaseous unpolymerized monomers, (which may include ethylene, propylene, and e.g., ethylidene norbornene).

Environmental restrictions may prevent the direct venting to the atmosphere of such materials and more importantly, health and safety considerations generally require that these materials be substantially removed from the solid polymer. The present invention may be employed to accomplish these desired objectives.

The process of the present invention is believed to involve only a physical process i.e., the monomer gases are only entrained or otherwise contained within and between the resin particles and diffuse out into a countercurrent gas purge stream. The diffusion of the monomer gases into the purge gas occurs until an equilibrium is established between the monomer concentration in the resin and in the purge gas. A large difference between monomer concentrations in the resin and in the purge stream obviously favors a high rate of diffusion. In addition, the rate of diffusion is dependent to a degree upon the temperature and pressure within the purge vessel, with higher temperatures favoring higher diffusion rates and therefore lower residence times in the purge vessel and with lower pressures also favoring higher rates of diffusion. The rate of diffusion also depends on the resin particle size and particle morphology, with the rate being higher for smaller particle sizes. Therefore, depending upon the initial monomer concentration in the resin and the final concentration desired, the residence time of the resin in the purge vessel can be determined using known mass transfer techniques based on the resin temperature, particle size distribution and morphology, rate of flow of purge gas, the pressure in the purge vessel, and the size of the purge vessel. In general for EPDM materials, when processing a particle size of about 0.025 inches average particle size having a temperature of about 60° C. and at a purge gas velocity of about 0.5 ft/second, a residence time on the order of about three hours is generally preferred to reduce the monomer concentration to a safe and environmentally acceptable value. It is preferred to feed to the purge vessel a purge gas which contains as little as possible or no hydrocarbons. Of course, economic considerations also affect the design of the purge vessel. Those skilled in the art will be able to practice the present invention based upon the more detailed discussions contained hereinbelow, and using standard chemical engineering techniques.

The drawing and particularly FIG. 1 illustrates a preferred embodiment of the process of the invention. Referring to FIG. 1 a purge vessel or tank 10 is shown which is provided with entry means such as conduit 12 for a solid polymer (resin) which must be purged and which is introduced into vessel 10 with a conveying gas. Vessel 10 has an upper portion 14 and a lower portion 16, the latter being adapted to accommodate an expanded bed of solids. In upper portion 14 there is positioned a feed means for accumulating and storing solids in the upper portion. Thus, upper portion 14 includes a hopper 18 terminating with angularly descending walls 20 which can be porous or non-porous extending from the inner periphery of vessel 10 to a hopper discharge means such as discharge pipe 22. The discharge pipe 22 separates the lower portion 16 from upper portion 14. Disposed beneath or below the feed means e.g. hopper 18 is a gas permeable, solids impermeable constraint means which defines the upper limit of an expanded bed of solids. The constraint means utilized in the invention include, for example, a porous conically shaped member 24 which extends from the end of discharge pipe 22 angularly to the inner periphery of vessel 10 in the lower portion 16 of vessel 10. The gas permeable solids impermeable constraint means, e.g. conically shaped member 24 defines the upper limit of the expanded bed of solids and also defines a gas collection chamber 26 between descending walls 20 of hopper 18 and conically shaped member 24.

Although discharge pipe 22 can be an independent element, preferably however it forms the upper portion of conically shaped member 24 and is integral therewith.

Figure 3:
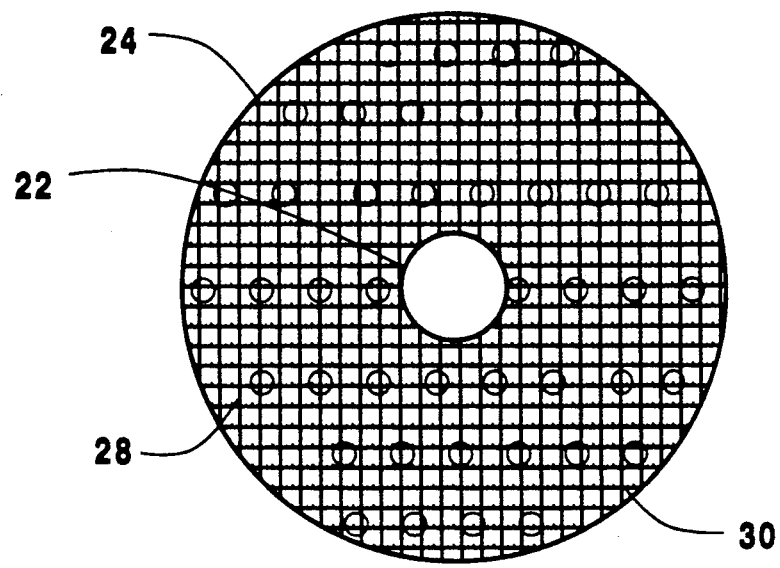
FIG. 3 represents a top view of gas permeable, solids impermeable member shown in FIG. 2.
Figure 2:
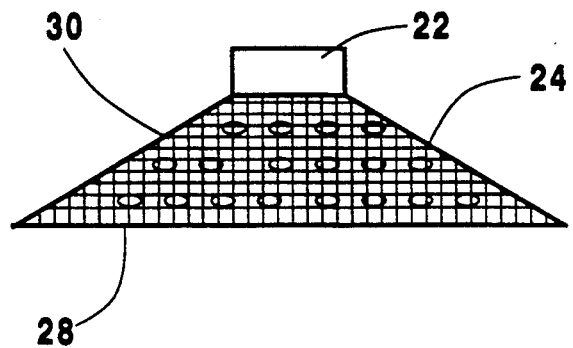
FIG. 2 is a side view of the gas permeable solids impermeable member used as the constraint means in the purge vessel of FIG. 1

As mentioned previously, conically shaped member 24 defines the upper limit of the expanded bed of solids. Thus, referring specifically to FIGS. 2 and 3, conically shaped member 24 is provided with a perforated plate 28 which is fabricated from an inert material and which is provided with perforations in an amount sufficient to permit passage of gas therethrough preferably while preventing the passage of solids. Perforated plate 28 has discharge pipe 22 disposed at its upper portion and perforated plate 28 extends radially and angularly downward with its terminal end being disposed either in contact with or immediately adjacent the inner walls of vessel 10. Perforated plate 28 is also lined with at least one layer of screen 30 with openings having a mesh size of from No. 1 to No. 300 or higher. The screen size and the number of layers of screens to be lined on perforated plate 28 are dependent upon the particle size of the solids to be processed inside the bed. Thus in general, the size of the openings 34 in perforated plate 28 depend upon the particle size of the solid polymer to be purged. Openings 34 should be of a size sufficient that in combination with the control of amount and velocity of inert purge gas, there is achieved expanded bed operation as contrasted to a packed bed or normal fluidized bed operation. The distance of the free space between the constraint means e.g., conically shaped member 24 and the top of the solids 32 in lower portion 16 is significant. If the free space is larger than the maximum distance that a solid bed can be expanded by the fluidized gas, then the constraint means will not suppress the fluidization of the bed, and the whole bed will become a bubbling bed. To minimize the size of the free space, perforated plate 28 is angularly disposed substantially parallel to the repose angle of solids. In other words, when the lower portion 16 of vessel 10 is filled with solids, there will be more solids at the center than at the sides. It is this angle i.e., the repose angle of solids which dictates the angle of placement of perforated plate 28, and as little free space as possible between solids 32 and perforated plate 28 should be permitted. The size of the constraint means i.e, perforated plate 28 is normally such that the radius of the circular portion at the terminal end is twice the amount of the height of the constraint means measured at the apex.

The purge gas, preferably an inert purge gas is introduced into vessel 10 at its lower end through conduit 35 and is directed through a gas distributing means such as distributor 36 which serves to provide uniform purge gas distribution. The gas distributor of choice should allow the solids to be discharged from the bottom of the bed and thus enable the solid bed to be operated in a counter-current mode. As shown in FIG. 1 distributor 36 is positioned at the base of vessel 10 in communication with conduit 35 and at a point slightly above conical portion 38 of vessel 10. Gas distributor 36 can be provided with transversely extending tubes 40 which have openings through which the purge gas can enter the interior of purge vessel 10. The openings and pattern of openings are such as to insure that enough back pressure can be built up so that purge gas is injected through all the openings evenly.

Conventional materials handling equipment and techniques can be employed in the process of the present invention. It is preferred, however, to use a purge vessel which has a conical portion as shown by reference numeral 38 in FIG. 1. In this case, in order to obtain the preferred flow of resin, it may be necessary to utilize an inverted conical insert or other means inside the bottom of the purge vessel. The height of this insert may be adjusted in order to provide the desired effect. Such inserts are commercially available. Dust collectors can also be utilized (although not shown in the drawing). The purpose of the dust collectors is to prevent the resin particles from being carried out of the top of the purge vessel with the exiting purge gas. Conventional dust collectors, such as commercially available bag filters, can be employed. Similarly, conventional coolers and blowers can be employed to provide the necessary materials handling capability and to control the temperature and pressure of resin and purge gas.

The temperature of the resin in the purge vessel is not critical and is normally dependent upon the temperature at which it is obtained from the polymerization reaction. However, the resin temperature affects the residence times as discussed below. In the case of ethylene copolymers, the resin can be obtained in the form of solid particles directly from the polymerization reaction at a wide reaction temperature such as about 50° C. to 85° C. It is economically desirable not to add additional heat to the resin before feeding the resin to the purge vessel. It is also desirable to keep the resin temperature lower than its softening or melting point. The higher the temperature in the purge vessel, the higher the rate of diffusion of the monomer gases from the solid to the purge gas. However, economic considerations may prevent additional heat from being added to the resins. Satisfactory results can be obtained by directly feeding the resin at its reaction temperature to the purging operation, even considering the fact that its temperature may decrease or increase slightly due to the temperature of the conveying gas.

The inert purge gas is preferably fed to the bottom of the purge vessel at ambient temperature although any temperature up to about the temperature of the resin is acceptable. Pressures utilized can range from below atmospheric pressures to pressures at or in excess of atmospheric pressures up to about 1 atmosphere or greater. Selection of appropriate pressure is primarily dictated by economic considerations and purging efficiency.

The inert purge gas employed in the practice of the present invention can be any gas which is substantially inert both to the resin being purged and the particular gaseous monomers being removed although in certain cases ethylene or other hydrocarbons can be employed. The preferred purge gas is nitrogen although other gases substantially inert in the process can be employed. It is preferred that the nitrogen content of the purge gas be at least about 90% and that oxygen be excluded from the purge gas. The maximum permissible oxygen content varies depending upon the particular hydrocarbon monomer gas being stripped. As the concentration of hydrocarbons increase in the presence of oxygen, the danger of explosion also increases, and this level varies with different hydrocarbons. Ideally, there should be no oxygen in the purge gas although a small amount can be tolerated depending upon the hydrocarbon concentration in the purge vessel and the monomers being stripped. Those skilled in the art can easily determine the tolerable oxygen levels given a particular monomer. Of course, the inert purge gas may also include small amounts of the gaseous monomers, although as their concentration increases, their diffusion rate and hence the resin residence time will be affected as discussed above. Other advantages of employing relatively pure nitrogen as a purge gas are that more hydrocarbon gases can be stripped from the resin particles and any pure nitrogen that may be discharged with the exiting resins does not contribute to atmospheric emissions as would gases containing impurities. It is therefore preferred that the purge gas be pure nitrogen.

The inert purge gas is fed to purge vessel 10, through conduit 35, thence through distributor 36 and then upward through perforated plate 28 and screen 30 in vessel 10. The purge gas countercurrently contacts the solid polymer and conveying gas entering vessel 10 through conduit 12, the purge gas being used in an amount and velocity sufficient to provide expanded bed operation. The inert purge gas passes through perforated plate 28 and through screen 30 and enters gas collecting chamber 26 where it is discharged from vessel 10 through discharge ports 48. If wall 20 is porous, the gas can then be discharged through pipe 50 and discharge ports 48 are not necessary. In order to achieve an expanded bed operation the velocity of inert purge gas entering vessel 10 must be regulated within certain parameters.

In general, the velocity of inert purge gas depends on the particle size of the solid polymer and should be sufficient to establish a fully expanded bed. It has been found that the velocity of inert purge gas can range from about 0.05 to about 2 ft/sec, preferably about 0.4 to about 1 ft/sec.

The rate of flow of resin through the purge vessel is not critical and depends upon the minimum residence time necessary to reduce the concentration of gaseous monomers in the resin to the desired level. It is preferred to reduce the hydrocarbon monomer gas content in the resin to below about 25-50 parts per million by weight, although the extent to which the hydrocarbon monomer concentration must be reduced depends upon both environmental and safety requirements. In any event the purging process of the present invention is effective to substantially reduce the hydrocarbon monomer gas content of the solid olefin polymer.

In order to permit discharge of purged solid polymers from vessel 10, the amount and velocity of inert gas fed to the vessel must be adjusted downward to permit the solids containing the reduced amounts of monomers to pass through the distributor 36 and to settle towards discharge end 42. Thus, for continuous operation, the amount and velocity of inert gas is periodically and cyclically lowered to below expanded bed operation. This permits the purged solid polymers to pass through gas distributor 36 into conical portion 38 and into rotary valve 44 for discharge through resin discharge conduit 46. The following examples will further illustrate the invention.

EXAMPLE 1

This example demonstrates inadequate purging using packed bed operation.

A batch of an ethylene propylene ethylidenenorbornene terpolymer (EPDM) was prepared by the gas phase process disclosed in U.S. Pat. No. 4,994,534 at a rate of 33 lb/hr. The average particle size was 0.025" with a standard deviation equal to 2. The residue of ethylidenenorbornene (ENB) in the EPDM polymer was 0.5 wt %.

After polymerization, a portion of the granular resin was transferred from the reactor to the purge vessel with a nitrogen conveying gas. The resin was deposited atop an existing resin bed in the purge vessel operated near atmospheric pressure. The bed level was maintained constant by means of a conventional level control device coupled with a rotary valve installed at the bottom of the purge bin. The operation temperature of the purge vessel was kept constant at 60° C.

With a nitrogen flow rate at 19.86 lb/hr., the gas superficial velocity in the purge vessel was 0.236 ft/s. The gas velocity was below that required to form an expanded bed in the purge vessel. The gas velocity required to expand the resin bed, in which the average particle size of the resin is equal to 0.025", without fluidizing the bed is between 0.25 and 0.48 ft/s. Thus, the present operation was a packed bed operation.

After 0.9 hours of purging, there was a failure to reduce the ENB residue from 0.5 wt % to 100 ppmw. With the purge gas channeling through the upper large section of the purge vessel, the resin in this upper layer of the vessel was not swept by the purge gas and was not purged. The concentration of ENB residue in the resin in the upper part of the vessel, was the same as the original ENB concentration in the resin transferred from the reactor.

EXAMPLE 2

This example demonstrates inadequate purging using fluidized bed operation.

A portion of the ethylene propylene ethylidenenorbornene terpolymer (EPDM) prepared in Example 1 was transferred from the reactor to the purge vessel. The resin was deposited atop an existing resin bed in the purge vessel operated near atmospheric pressure. The bed level was maintained constant by means of a conventional level control device coupled with a rotary valve installed at the bottom of the purge bin. The operation temperature of the purge vessel was kept constant at 60° C.

With a nitrogen flow rate of 39.72 lb/hr. the gas superficial velocity in the purge vessel was 0.536 ft/s. The gas velocity was above the velocity which can completely fluidize the resin bed in the purge vessel. The minimum gas velocity required to fluidize the resin bed having an average particle size of the resin of about 0.025" was 0.48 ft/s. The present operation was a completely fluidized bed operation.

After 1.2 hours of purging, there was a failure to reduce the ENB residue from 0.5 wt % to 100 ppmw. Due to the severe solid backmixing in the fluidized bed, the physical properties were expected to be homogeneous in the bed and in fact were. The concentration of ENB residue in the resin however remained the same.

EXAMPLE 3

This example demonstrates the successful purging of ENB by practicing the process of the invention.

A portion of the ethylene propylene ethylidenenorbornene terpolymer prepared in Example 1 was transferred from the reactor to a purge vessel similar to the one shown in FIG. 1. The resin was deposited in the feed tank of the vessel and then fed into the purge vessel operated near atmospheric pressure. There was a perforated inverse-cone installed atop of the resin bed in the purger to suppress the fluidization of the resins. The cone had a perforated plate with perforations in it in the form of round holes of about ¼ inch diameter. On top of the perforated plate was a screen having a mesh size of about No. 200 mesh. The height of the inverse cone divided by the diameter was in 1 to 4 ratio. The purging residence time was maintained constant by means of a conventional control device coupled with a rotary valve installed at the bottom of the purge bin. The operation temperature of the purge vessel was kept constant at 60° C.

With a nitrogen flow rate at 39.2 lb/hr., the gas superficial velocity in the purge vessel was 0.46 ft/s. The gas velocity was above the velocity which can completely fluidize the resin bed in the purge vessel. However, instead of operating the purger in a fluidized bed mode, the perforated inverse-cone atop the resin bed suppressed the fluidization of the resin bed and permitted operation of the purger in an expanded bed counter-current mode.

After 1.46 hours of purging, the present operation successfully reduced the ENB residue from 0.5 wt % to below 100 ppmw. With purge gas sweeping uniformly through the resin bed, the concentration of ENB residue in the resin was gradually purged out when the resin travelled down the purger.

EXAMPLE 4

This example demonstrates the successful purging of ENB by practicing the process of the invention.

A portion of the ethylene propylene ethylidenenorbornene terpolymer prepared in Example 1 was transferred from the reactor to a purge vessel similar to the one shown in FIG. 1. The resin was deposited in the feed tank of the vessel and then fed into the purge vessel operated near atmospheric pressure. There was a perforated inverse-cone installed atop of the resin bed in the purger to suppress the fluidization of the resins. The cone had a perforated plate with perforations in it in the form of round holes of about ¼ inch diameter. On top of the perforated plate was a screen having a mesh size of about No. 200 mesh. The height of the inverse cone divided by the diameter was in 1 to 4 ratio. The purging residence time was maintained constant by means of a conventional control device coupled with a rotary valve installed at the bottom of the purge bin. The operation temperature of the purge vessel was kept constant at 60° C.

With a nitrogen flow rate at 44.8 lb/hr., the gas superficial velocity in the purge vessel was 0.53 ft/s. The gas velocity was above the velocity which can completely fluidize the resin bed in the purge vessel. However, instead of operating the purger in a fluidized bed mode, the perforated inverse-cone atop the resin bed suppressed the fluidization of the resin bed and permitted operation of the purger in an expanded bed counter-current mode.

After 1.2 hours of purging, the present operation successfully reduced the ENB residue from 0.5 wt % to below 100 ppmw. With purge gas sweeping uniformly through the resin bed, the concentration of ENB residue in the resin was gradually purged out when the resin travelled down the purger.

EXAMPLE 5

This example demonstrates the successful purging of ENB by practicing the process of the invention.

A portion of the ethylene propylene ethylidenenorbornene terpolymer prepared in Example 1 was transferred from the reactor to a purge vessel similar to the one shown in FIG. 1. The resin was deposited in the feed tank of the vessel and then fed into the purge vessel operated near atmospheric pressure. There was a perforated inverse-cone installed atop of the resin bed in the purger to suppress the fluidization of the resins. The cone had a perforated plate with perforations in it in the form of round holes of about ¼ inch diameter. On top of the perforated plate was a screen having a mesh size of about No. 200 mesh. The height of the inverse cone divided by the diameter was in 1 to 4 ratio. The purging residence time was maintained constant by means of a conventional control device coupled with a rotary valve installed at the bottom of the purge bin. The operation temperature of the purge vessel was kept constant at 80° C.

With a nitrogen flow rate at 33.6 lb/hr., the gas superficial velocity in the purge vessel was 0.41 ft/s. The gas velocity was above the velocity which can completely fluidize the resin bed in the purge vessel. However, instead of operating the purger in a fluidized bed mode, the perforated inverse-cone atop the resin bed suppressed the fluidization of the resin bed and permitted operation of the purger in an expanded bed counter-current mode.

After 0.268 hours of purging, the present operation successfully reduced the ENB residue from 0.5 wt % to below 100 ppmw. With purge gas sweeping uniformly through the resin bed, the concentration of ENB residue in the resin was gradually purged out when the resin travelled down the purger.

EXAMPLE 6

This example demonstrates the successful purging of ENB in a continuous operation mode, by practicing the process of the invention.

A portion of the ethylene propylene ethylidenenorbornene terpolymer prepared in Example 1 was transferred from the reactor to a purge vessel similar to the one shown in FIG. 1. The resin was deposited in the feed tank of the vessel and then fed into the purge vessel operated near atmospheric pressure. There was a perforated inverse-cone installed atop of the resin bed in the purger to suppress the fluidization of the resins. The cone had a perforated plate with perforations in it in the form of round holes of about ¼ inch diameter. On top of the perforated plate was a screen having a mesh size of about No. 200 mesh. The height of the inverse cone divided by the diameter was in 1 to 4 ratio. The purging residence time was maintained constant by means of a conventional control device coupled with a rotary valve installed at the bottom of the purge bin. The operation temperature of the purge vessel was kept constant at 80° C. The flow rate of the purge gas was adjusted cyclically to allow the resin to be discharged periodically and thus constitute a continuous operation. The flow rate of the purge gas was decreased to 15 lb/hr. before the resin was discharged, and was increased back to 33.6 lb/hr. after the resin was discharged.

With a nitrogen flow rate at 33.6 lb/hr., the gas superficial velocity in the purge vessel was 0.41 ft/s which was in the range that the purge gas can expand the resin bed in the purge vessel, but not fluidized the bed. The present operation was thus an expanded bed counter-current operation.

After 0.268 hours of purging, the present operation successfully reduced the ENB residue from 0.5 wt % to below 100 ppmw. With purge gas sweeping uniformly through the resin bed, the concentration of ENB residue in the resin was gradually purged out when the resin travelled down the purger.

What is claimed is:

1. A process for removing unpolymerized gaseous monomers from a solid olefin polymer containing said gaseous monomers which comprises:
    (a) counter-currently passing a purge gas through said polymer in a purge vessel in an amount and at a velocity sufficient to remove substantially all of said gaseous monomers from said polymer and to form and maintain a fully expanded bed within said vessel having an upper limit defined by gas permeable, solids impermeable constraint means positioned within said vessel;
    (b) passing said gaseous stream containing said gaseous monomer through said constraint means and thence out of said vessel; and
    (c) discharging polymer solids from said vessel.

2. A process according to claim 1 wherein said purge vessel has an upper portion and a lower portion and wherein said gas permeable solids impermeable constraint means is a porous conically shaped member including a perforated plate disposed in said lower portion.

3. A process according to claim 2 wherein said perforated plate is lined with at least one layer of screen which has openings adapted to permit gas to pass therethrough while preventing the passage of solids therethrough.

4. A process according to claim 2 wherein said perforated plate extends radially and angularly downward in said vessel with its terminal end being disposed either in contact with or immediately adjacent the inner walls of said purge vessel.

5. A process according to claim 2 wherein the angle of said perforated plate is substantially parallel to the repose angle of solids in said lower portion.

6. A process according to claim 3 wherein said at least one layer of screen has an opening of a mesh size of from No. 1 to about No. 300.

7. A process according to claim 5 wherein the free space between said perforated plate and the repose angle of said solids is not larger than the maximum distance that a solid bed can be expanded.

8. A process according to claim 1 wherein said solid olefin polymer is an ethylene propylene diene monomer resin.

9. A process according to claim 1 wherein said solid olefin polymer is an ethylene propylene ethylidenenorbornene resin.

10. A process according to claim 1 wherein said purge gas is an inert purge gas.

11. A process according to claim 10 wherein said inert purge gas is nitrogen.

12. A process according to claim 10 wherein said inert purge gas is fed to said purge vessel at a velocity of about 0.05 to about 2 ft/sec.

13. A process according to claim 10 wherein said inert purge gas is fed to said purge vessel at a velocity of about 0.4 to about 1 ft/sec.

14. A process according to claim 10 wherein said inert purge gas is passed through a gas distributor means positioned in said vessel.

* * * * *